United States Patent
Yarmchuk (10) Patent No.: US 6,600,621 B1
(45) Date of Patent: Jul. 29, 2003

(54) TECHNIQUES FOR MULTITRACK POSITIONING AND CONTROLLING ERROR GROWTH IN SELF-SERVOWRITING SYSTEMS

(75) Inventor: Edward John Yarmchuk, Somers, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 353 days.

(21) Appl. No.: 09/583,832

(22) Filed: May 31, 2000

(51) Int. Cl.[7] .............................................. G11B 21/02
(52) U.S. Cl. ...................................... 360/75; 360/77.08
(58) Field of Search ........................... 714/718; 360/75, 360/65, 69, 77.02, 77.05, 77.08, 78.09, 78.04, 48, 51; 369/44.35, 44.36

(56) References Cited

U.S. PATENT DOCUMENTS

| | | | | |
|---|---|---|---|---|
| 4,594,622 A | * | 6/1986 | Wallis | 360/77 |
| 5,659,436 A | | 8/1997 | Yarmchuk et al. | 360/75 |
| 5,757,574 A | | 5/1998 | Chainer et al. | 360/75 |
| 5,793,554 A | * | 8/1998 | Chainer et al. | 360/75 |
| 5,822,143 A | * | 10/1998 | Cloke et al. | 360/65 |
| 5,907,447 A | | 5/1999 | Yarmchuk et al. | 360/75 |
| 6,344,942 B1 | * | 2/2002 | Yarmchuk | 360/75 |
| 6,347,018 B1 | * | 2/2002 | Kadlec et al. | 360/77.08 |
| 6,437,947 B1 | * | 8/2002 | Uno | 360/278.04 |

OTHER PUBLICATIONS

William H. Press et al., Numerical Recipes in Fortran 77, 1997, Cambridge University Press, Second edition, pp. 395–396.*

* cited by examiner

Primary Examiner—Albert Decady
Assistant Examiner—Dipakkumar Gandhi
(74) Attorney, Agent, or Firm—Blanche E. Schiller; Kevin Redigan (57) ABSTRACT

A technique, including a method and associated system, for multitrack positioning during self-servowriting on a storage medium, and for controlling error growth as the servowriting steps across the storage medium. Readback amplitudes of multiple bursts from previously written tracks are combined using a parabolic interpolation relationship, for positioning when writing bursts on a subsequent track. This technique is especially useful for systems in which the read element is separated from the write element in the direction in which the servowriting steps across the medium. Also disclosed is an associated technique for controlling error growth, in which a reference waveform is derived and stored for use when writing subsequent tracks. The individual reference adjustments resultant from the multitrack positioning signal are combined in a weighted sum which controls error growth when the weights are calculated properly, as disclosed herein.

26 Claims, 5 Drawing Sheets fig. 1 fig. 2 fig. 3 fig. 4 fig. 5

TECHNIQUES FOR MULTITRACK POSITIONING AND CONTROLLING ERROR GROWTH IN SELF-SERVOWRITING SYSTEMS

TECHNICAL FIELD

The present invention relates to data storage media. More particularly, the present invention relates to the self-servowriting of servo patterns on storage media.

BACKGROUND OF THE INVENTION

Self-servowriting has become an attractive technique for producing servopatterns on disk files because it eliminates the need for costly, external positioning systems, and can be performed outside of a clean room environment. In general, this technique involves using the read and write elements installed on the actuator of the disk drive "in-situ" to initially write the servo pattern, which is thereafter used to correctly position the actuator during drive operation by a user.

Techniques for self-propagation of both radial positioning servo patterns and circumferential timing patterns have been developed recently. For example, in commonly assigned U.S. Pat. No. 5,659,436 entitled "Radial Self-Propagation Pattern Generation for Disk File Servowriting" (incorporated by reference herein in its entirety) the servo position signal used to control the head location while writing the next servo track is derived from the readback amplitude of a single track written one step earlier. In modern disk files, however, the read element can be offset from the write element on the actuator by as much as several tracks. When this read-to-write element offset gets large, it becomes desirable to use a combination of readback amplitudes from several earlier-written tracks to provide the position signal for the next track as described in commonly assigned U.S. Pat. No. 5,757,574 (incorporated by reference herein in its entirety) entitled "Methods and Systems for Self-Servowriting Including Maintaining a Reference Level Within a Usable Dynamic Range." In such a case, the track immediately preceding the track being written is not reachable because of the offset between the read and write elements. A result of this process is that a given track contributes to the servo position determination on several subsequent tracks, each time with a different weight factor applied to its readback amplitude, in a weighted sum relationship.

A key challenge in radial self-propagation is the control of track shape error growth as the actuator is stepped across the disk surface to write the sequential servo-pattern tracks. The techniques described above compensate for the read-write element offset, however, a method for controlling track shape error growth has not been proposed.

SUMMARY OF INVENTION

In accordance with the present invention, a technique is disclosed for controlling error growth as the servowriting steps along the storage medium, along with a multitrack positioning technique.

In that regard, the present invention, in a first aspect, is a method for servowriting on a data storage medium in which a center of a write element is separated from a center of a read element along a direction in which the servowriting steps. One or more bursts are written on one track of the storage medium while servoing using a position signal derived from respective readback amplitudes of other bursts written previously on a plurality of tracks. A reference waveform is derived as a function of a position error waveform. The position error waveform corresponds to one or more position errors of the read element relative to the other bursts. The reference waveform is used when writing subsequent tracks on the storage medium when the read elements overlaps the one track.

The reference waveform is derived, in one embodiment, by calculating at least one complex coefficient of a discrete fourier transform of the position waveform; multiplying the complex coefficient by a complex filter factor f, thereby creating at least one filtered coefficient; calculating an inverse discrete fourier transfer of the at least one filtered coefficient; and adding the inverse discrete fourier transform to a nominal average reference level to form the reference waveform. The filter factor f can be computed from a predetermined function of a closed loop response C of a servoloop used for the servowriting. Multiple reference waveforms from respective tracks are combined in a weighted sum, the weights of which are calculated according to the relative sensitivity of the position signal to shifts in the position of each of the tracks respectively.

In another aspect of the present invention, which can be used in combination with the first aspect disclosed above, or separately, a method for servowriting on a data storage medium is provided in which a center of a write element is at least partially separated from a center of the read element along a direction in which the servowriting steps. In this multitrack positioning embodiment, one or more bursts are written on one track of the storage medium while servoing using a position signal derived from respective readback amplitudes of other bursts written previously on a plurality of tracks. In this embodiment, the position signal is derived using a parabolic interpolation of the readback amplitudes of the other bursts written previously on the plurality of tracks.

In one embodiment, three tracks are used in the parabolic interpolation, the center of which has the highest readback amplitude, a track preceding the center track having a lower amplitude, and a track subsequent to the center track, having another, lower amplitude. A specific form of the parabolic interpolation function is also disclosed herein.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE INVENTION

Figure 1:
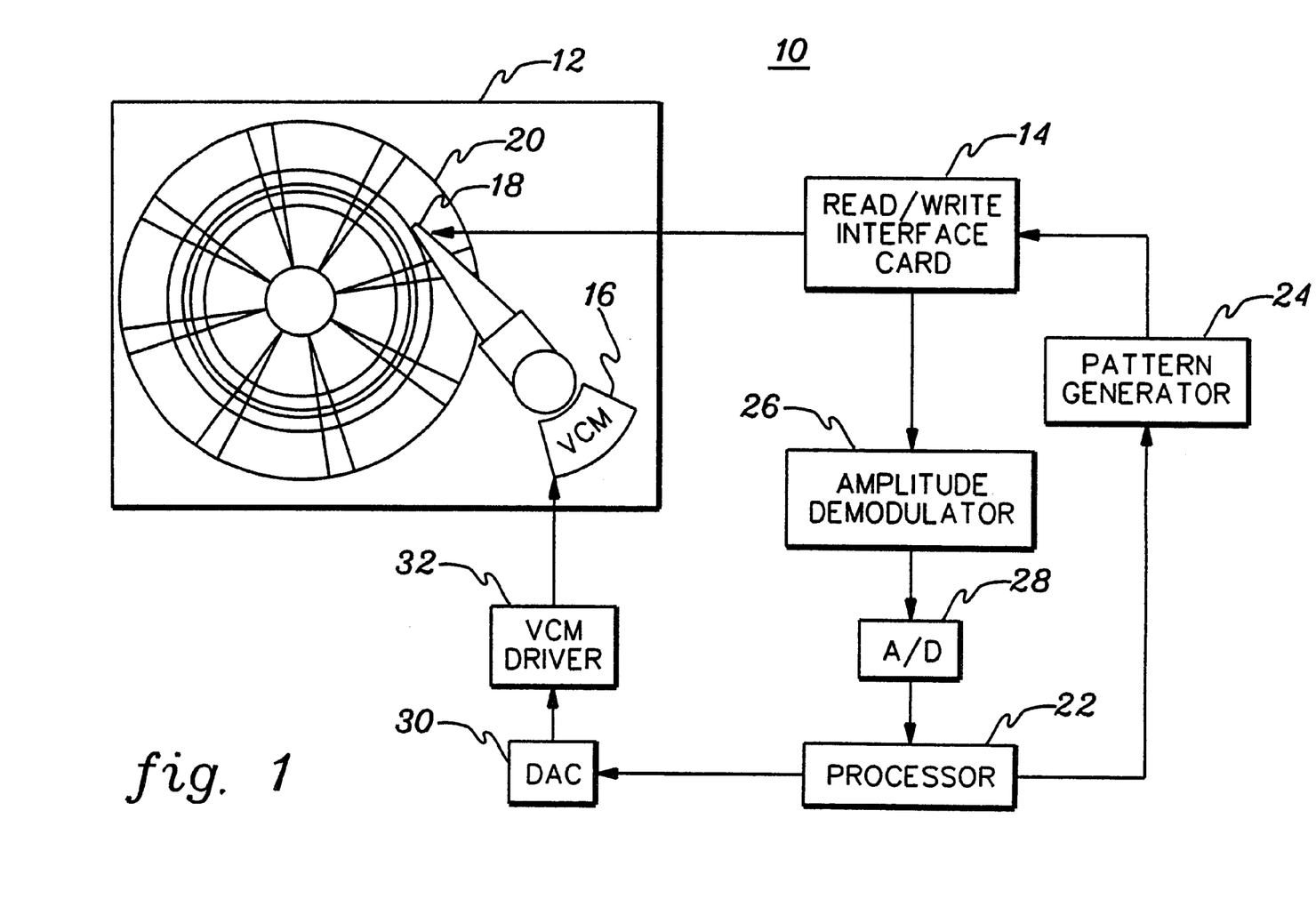
FIG. 1 depicts a data storage device with a storage medium and associated servo electronics used in the self-servowriting of the present invention.

FIG. 1 shows the exemplary elements of a data storage system 10, which are used for radial self-propagation and servopattern writing. A disk file 12 is connected to electronics 14 for reading and writing patterns on the medium 20, and for activating the voice coil motor ("VCM") 16 that moves the actuator, terminating in head 18, approximately radially across the medium 20. The processor 22 controls a pattern generator 24 that writes patterns of magnetic transitions on selected regions of the medium. The RF readback signal from the read element is demodulated by amplitude demodulator 26 to yield amplitude signals that reflect the overlap of the read element with the previously written patterns of magnetic transitions. The amplitude signals are digitized by an analog-to-digital converter 28 ("A/D") and analyzed by the processor 22 to obtain a position signal. The processor 22 computes numerical control signals that are converted to analog form by the digital-to-analog converter ("DAC") 30 and processed into a control current by the VCM driver circuit 32, to drive the VCM 16 and position the head 18 appropriately.

Figure 2:
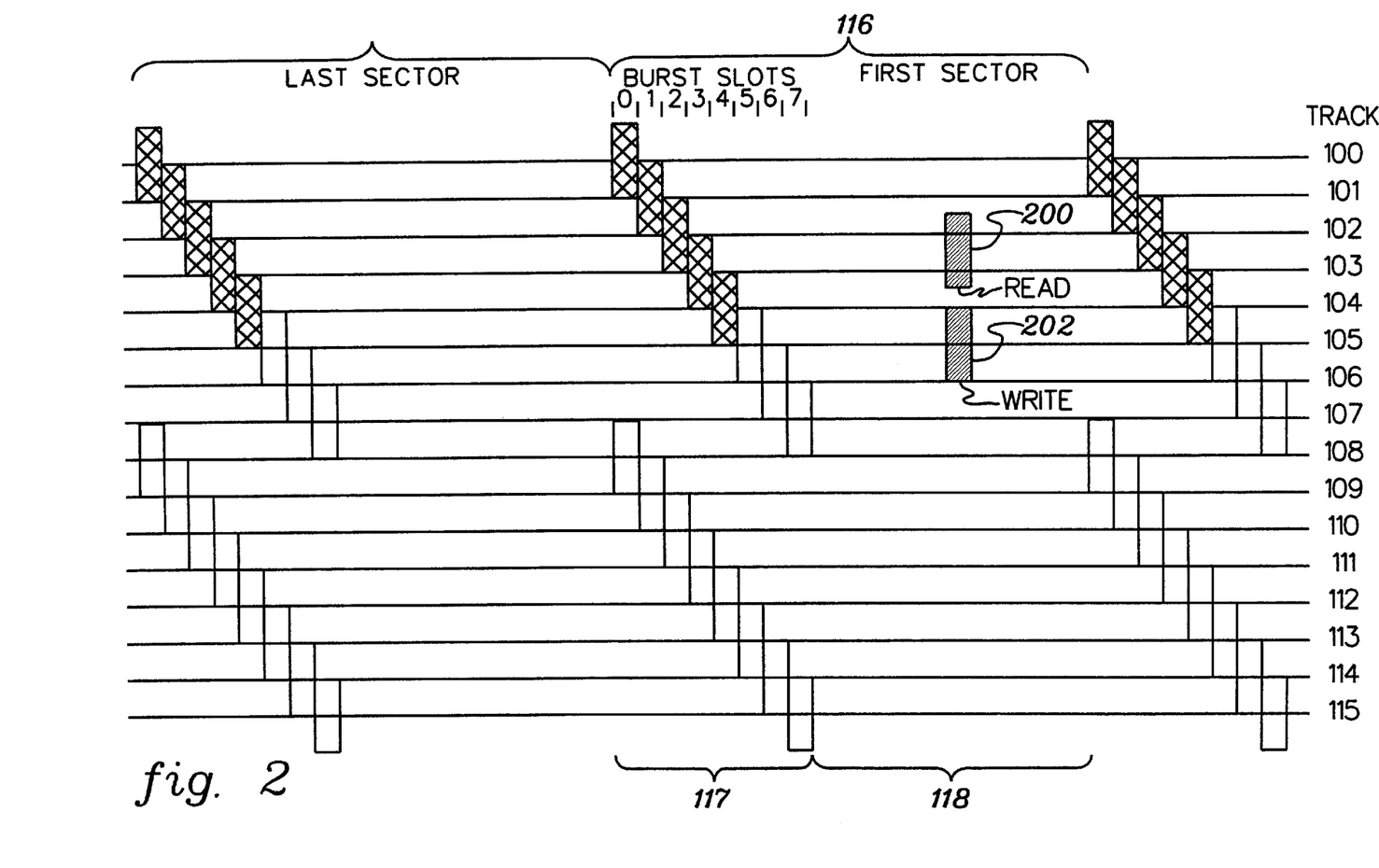
FIG. 2 depicts a portion of the storage medium of FIG. 1 showing exemplary tracks, and self-servowriting bursts written therein.

FIG. 2 shows a portion of the recording medium illustrating its division into a number of propagation tracks 100, 101, 102, etc. as well as a division of each track into a number of sectors, with a first sector 116 typically coming immediately after the disk rotation index as determined by an index pulse from the disk spindle motor driver. Each sector is further divided into a region 117 containing the amplitude bursts for propagation and a region 118, which is reserved for the use of the precision timing propagation system and for writing the actual product servopattern including sector ID fields and either amplitude burst or phase encoded patterns. In one embodiment of this system, propagation burst areas 117 will be overwritten with user data during user operation, following self-servowriting. All of region 118 except for the portion containing the product servopattern may also be overwritten with user data.

Each propagation burst region is further divided into a number of burst slots within which the amplitude burst patterns for propagation are written. In this example, 8 slots numbered 0–7 are shown. Also shown are the read element 200 and write element 202 in an exemplary position over the medium. The write element is positioned for writing track 105, and due to the large offset, the read element straddles several previously written tracks. At a servo track spacing of one half of the data cylinder spacing, the read element can typically overlap 3 tracks at any time, as shown in FIG. 2.

In this figure, crosshatched bursts indicate bursts on tracks that have already been written. (With large read/write offsets, several tracks must be prepared in advance before a servo based on multiple tracks can be employed. Various methods for preparing this initial set of tracks exist, including that disclosed in the commonly-assigned, concurrently-filed U.S. Patent Application entitled "Creating an Initial Set of Tracks in a Self-Servowriting System Using a Compliant Crashstop to Control Head Movement," incorporated herein by reference in its entirety. It will be assumed herein that a set of initial tracks is present.)

Figure 3:
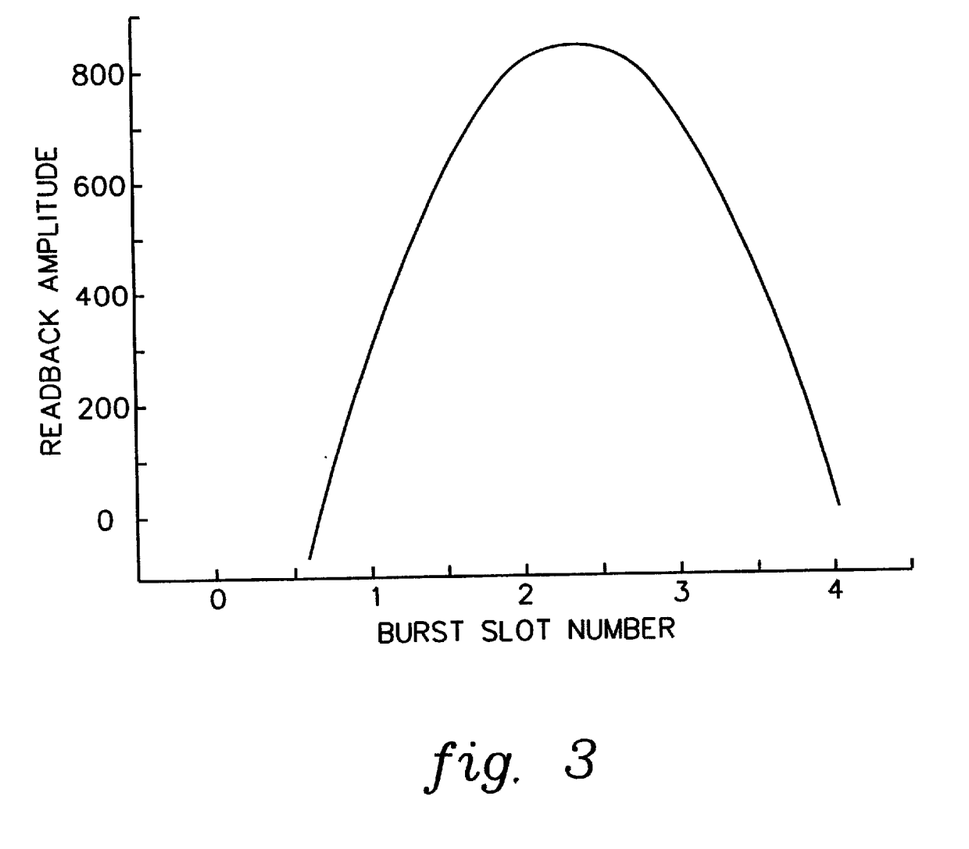
FIG. 3 is a plot of the readback amplitudes of bursts from five previously written tracks, and a superimposed parabolic interpolation function in accordance with the present invention.

Multitrack Position Signal:

In a multitrack servo mode of the present invention, all three readback amplitudes are used to compute a servo position signal using a parabolic interpolation formula. This is illustrated in FIG. 3, which shows the demodulated readback signal together with dots representing the digitized values for the three relevant time slots, and the parabola defined by the three readings. The horizontal axis for the parabola is in units of servo tracks or slot number since the initial tracks were written at the desired spacing.

The peak of the parabola is located at a position, P, given by:

$$P = \frac{1}{2} \cdot \frac{V_C - V_A}{2V_B - V_A - V_C}, \quad (1)$$

where $V_A$, $V_B$, and $V_C$, are the readback amplitudes for the three bursts. The center B burst is assumed to have the highest readback amplitude. The A burst was written one step before B, and the C burst was written one step after B. The above equation gives the position of the peak relative to the B track location, and lies between −0.5 and +0.5. The servo position signal, PS, equals the B track number plus P. In FIG. 3, for example, the B track number is 2 so the PS is approximately 2.3.

Due to the finite number of available time slots, the slot numbers wrap back to zero as the track number increases so the relationship between track and slot is not always as simple as this example. However, with N slots numbered from 0 to N−1, the slot number associated with a given track is easily computed since it will equal the track number modulo N.

Figure 4:
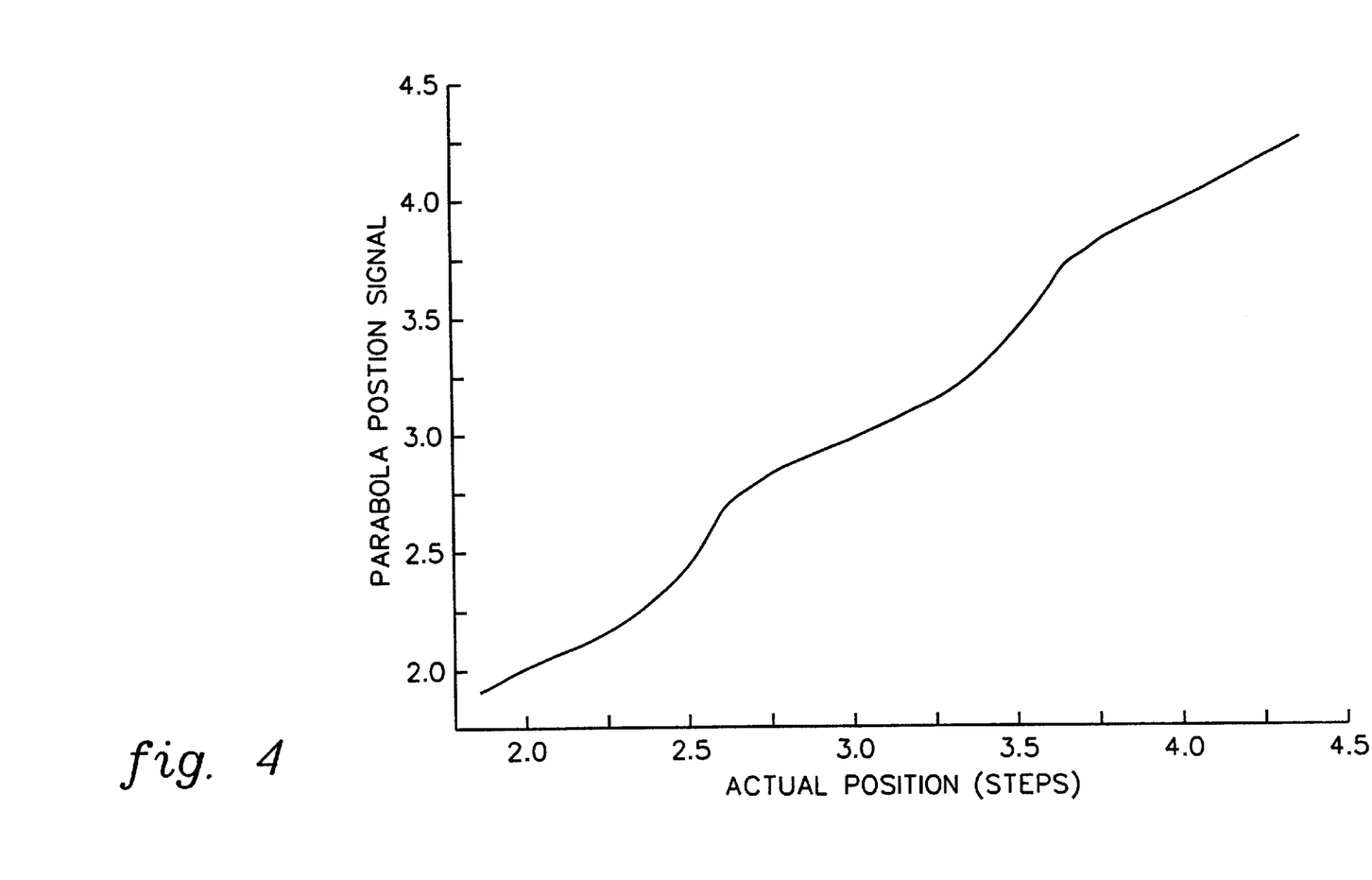
FIG. 4 is a plot of the potential non-linearity of the actual vs. interpolated head position.

Unlike single-burst servo mode, in which the position signal represents a fractional amplitude (range =0–1), the multiburst signal represents an interpolated track number for the three active signal tracks that the read element can sense at any one time. Thus, a change in PS of 1.0 corresponds to one servo step. However, the interpolated PS value is not a perfectly linear function of the head position, so the differential sensitivity varies over the range of possible P values. Part of the non-linearity comes from curvature in the readback profile, but a some also arises from the parabola approximation. FIG. 4 shows a plot of PS vs. head position for a typical head.

The shape of this curve depends on read width, write width, and servo track spacing. When writing new servo tracks, the head always steps forward in units of one step which equals the periodicity of the non-linearity curve. Thus, the non-linearity does not directly affect the track spacing.

The next track to be written lies ahead of the existing ones, and might, for example, be track number 105 for the case shown in FIG. 2. This would correspond to having a read to write offset equal to 2.7 steps since the write element is located at track number 5 and the read is at 2.3. In this case, the absolute spacing between tracks is equal to the read to write offset distance divided by 2.7.

Stepping forward is accomplished by changing the reference input to the servo. The position error signal, or PES, equals the reference minus the PS, and the controller acts to reduce this error to zero by changing the VCM current. Adding 1.0 to the reference causes the servo to reposition the head so that the PS increases by the same amount. After settling at the new position the next track is written.

In some cases, especially with rotary actuators, the read to write offset changes as the actuator moves in an arc across the disk. To avoid a change in absolute track spacing, the point P at which writing must take place must be adjusted. This gradual change can be dealt with in a manner similar to that described in U.S. Pat. No. 5,659,436 by stopping every 40 tracks or so, measuring the cylinder to cylinder spacing of the last few tracks, and adjusting the servo reference by a small amount to maintain a desired spacing. If the spacing is too large, the reference would be decreased slightly. This corresponds to shifting the read element backwards with respect to the propagation direction, thereby bringing the next written track closer to the existing ones. The reference increments for subsequent steps remains exactly 1.0, but the track spacing is reduced.

The PS non-linearity does have a direct effect on the open loop gain of the servo. In cases where the offset changes during the propagation it may be desirable to compensate, to maintain servo stability. Also, as will be described, proper control of error growth includes calculations that depend on the closed loop response of the servo so it is desirable to keep this nearly constant. This can be accomplished by adjusting the servo gains by factors that are predetermined based on measurements of the position non-linearity curve using external positioning equipment on a representative disk file.

Alternatively, in-situ measurements of the closed loop response can be performed by applying a sinusoidal modulation signal to the servo reference and measuring the amplitude and phase of the resulting modulation of the position error signal, or PES. The closed loop response equals one minus the ratio of the PES to the applied reference modulation. Whenever the fractional servo point, P, is changed to maintain constant track spacing, the closed loop response would be measured and the servo gains adjusted until a sufficiently close match is obtained. Alternatively, the servo gains could be determined at the beginning of the propagation at several representative fractional servo points and interpolated to yield new gains throughout the propagation itself.

In practice, the transfer function need only be measured at a single frequency. A good choice is where the magnitude of the closed loop response is roughly 0.5 (typically 10–15 times the rotation frequency). This frequency is high enough that details like actuator pivot properties have very little effect, yet low enough that the servo response can be measured quickly and accurately. It is also desirable to avoid large resonances like the butterfly mode of the actuator. With a good choice of frequency, the magnitude of the open or closed loop response varies almost directly in proportion to the overall gain factor, making iterative adjustment of the gain a fast and simple process.

Controlling Track Shape Error Growth:

In self-servowriting, track shape errors are carried forward from step to step because the servo follows the errors on existing tracks when writing a new one. A track shape error acts like an unintended additional reference input to the servo and the response is given by the closed loop transfer function of the system. Thus, an error on one step will be transformed via the closed loop response into an error on the next step. Since written-in errors are repeatable with disk rotation, they can be expressed using Discrete Fourier Transforms having coefficients at integer multiples of the rotation frequency up to a maximum frequency multiple equal to half of the number of sectors.

Typically, a reasonably strong control loop will have a closed loop response that is very close to 1 at low frequencies, exceeds 1 at intermediate frequencies, and then drops off to zero at high frequencies. Unless some form of error correction is applied, frequency components at which the closed loop response exceeds 1 will grow exponentially with step number.

In U.S. Pat. No. 5,659,436, control of track shape error growth involves computing the Discrete Fourier Transform of the PES while writing a track, multiplying the coefficients by a vector of complex filter factors, f, and inverse transforming to obtain a time domain waveform of AC reference correction values. The AC reference correction values are added to the DC part of the servo reference (also referred to as the nominal average reference level) and are used after stepping to the track that was just written. The filter factors are computed using the formula $f=(S-C)/(1-C)$, where C is a complex valued vector equal to the closed loop response of the servo at integer multiples of the disk rotation frequency and S is the desired step-to-step error amplification factor. With S having a magnitude less than unity, errors decay, and the propagation process is stable.

In the present invention, this technique has been extended to cover the multitrack servo process, disclosed above. The reference adjustments are computed as before for each written track, and are stored for use when the read element, which lags the write by several steps, actually reaches a track. Since the multitrack servo procedure involves three written tracks at a time in the above exemplary embodiment, the individual reference adjustments can be combined in a weighted sum.

Figure 5:
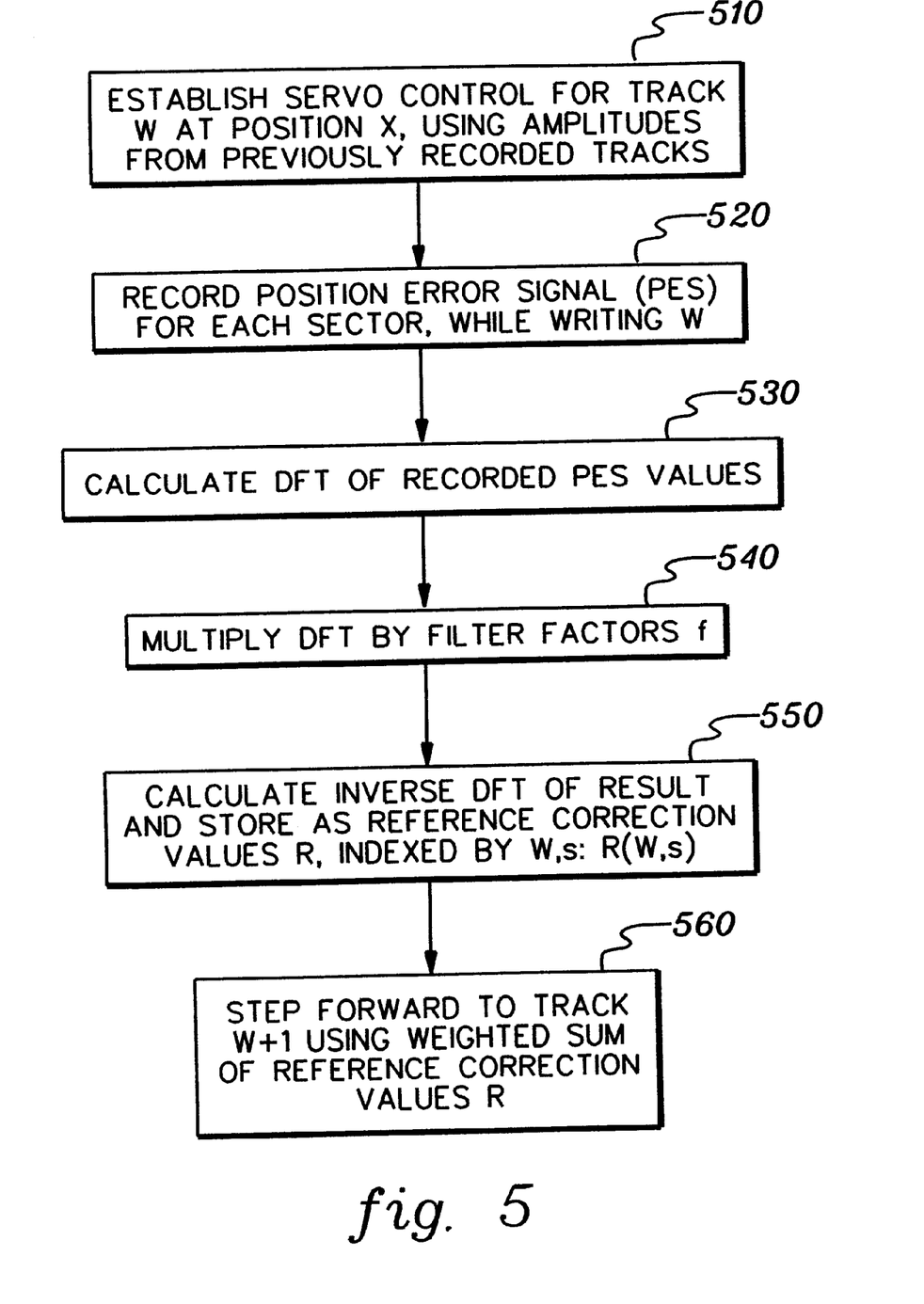
FIG. 5 is a flow diagram of the technique of the present invention wherein the growth of errors is controlled.

More specifically, the method of the present invention comprises the following steps with reference to FIG. 5.

Servo control is established at a position X defined by the readback amplitudes from three previously written tracks (Step 510).

A new track number W is written by enabling writing of radial burst patterns for the next available time slot (W modulo the number of slots). While writing, the servo PES is recorded for each sector, resulting in a discrete time domain waveform stored in memory (Step 520).

The waveform of PES values is transformed using the Discrete Fourier Transform, or DFT, to obtain a set of complex, frequency domain coefficients (Step 530). These are multiplied by the vector of complex filter factors, f, which have been previously computed according to the formula $f=(S-C)/(1-C)$, in which C is the closed loop response of the servo and S has a magnitude less than 1 (Step 540). The scaled coefficients are used in performing an inverse DFT which results in a discrete time domain waveform of reference correction values, R. These are stored in memory for later use, indexed by the written track number W and sector s, i.e. R(W,s) (Step 550).

The head is stepped forward by one track by changing the servo reference.

The servo reference for each sector is set equal to a DC reference plus an AC reference. The DC reference equals X+1.0 and is the same for every sector. The AC reference is the sum of three terms, $w_A R(t_A,s)+w_B R(t_B,s)+w_C R(t_C,s)$. Here A, B and C refer to the roles played by each track in the parabola approximation, and $w_A$, $w_B$, and $w_C$ are weight factors associated with each role. The R's are the previously stored reference corrections values at the corresponding tracks, $t_A$, $t_B$, and $t_C$, and the sector s (Step 560).

After the head has settled at the new track location, which is typically one revolution of the disk later, a new track, W+1, is written and the process is repeated.

The proper choice of reference correction weight factors is very important for control of error growth. The present invention provides a method that ensures that errors will decay. The underlying concept is that the weights should reflect the relative contribution of errors in track position to the PES. Assuming small deviations, position signal changes are obtained by applying the chain rule for derivatives, $$\delta P = \frac{\partial P}{\partial V} \cdot \frac{dV}{dX} \cdot \delta X.$$

Here δP is the change in the position signal arising from a change in track location δX. The derivatives depend on the burst being considered (A, B, C) so this needs to be analyzed for all three. For the parabola interpolation method, equation 1 can be differentiated to give $$\frac{\partial P}{\partial V}$$

for each/burst:

$$\frac{\partial P}{\partial V_A} = \frac{P - 0.5}{2V_B - V_A - V_C}, \quad (2)$$
$$\frac{\partial P}{\partial V_B} = \frac{-2P}{2V_B - V_A - V_C},$$
$$\frac{\partial P}{\partial V_C} = \frac{P + 0.5}{2V_B - V_A - V_C}.$$

The second link in the chain of derivatives, $$\frac{dV}{dX},$$

is the derivative of the readback profile. This can vary from head to head, so it is best to actually measure this during the servowrite process or at the start. If the read to write offset is changing, this can be done during the recalibrations immediately following the determination of a new DC servo reference value. The measurement can be performed as follows. While servoing to a position P+ΔP, the 3 readback amplitudes are recorded. The amplitudes are measured again at position P−ΔP, and subtracted from the first readings. Here ΔP a small change in position, such as 0.05 for example. This gives the voltage change for a PS change equal to 2ΔP. The voltage derivatives are equal to $$\frac{\Delta V}{2\Delta P},$$

where ΔV represents the difference in readback amplitudes. The three weight factors are then given by:

$$\omega A = \frac{\partial P}{\partial V_A} \cdot \frac{\Delta V_A}{2\Delta P}, \quad \omega B = \frac{\partial P}{\partial V_B} \cdot \frac{\Delta V_B}{2\Delta P}, \quad \omega C = \frac{\partial P}{\partial V_C} \cdot \frac{\Delta V_C}{2\Delta P}. \quad (3)$$

The parabola formula is only one of many possible ways to compute an interpolated position signal from readback amplitudes on multiple tracks. The present invention can be applied to any technique in which the position signal depends on multiple readback amplitudes. The waveforms of reference correction values would be computed and stored for each written track as described above. These would be combined using a weighted sum to get the AC reference correction that is applied to the servo, and the weights would equal the relative sensitivity of the position signal to shifts in the position of each of the contributing tracks respectively. These would equal the partial derivative of the position signal with respect to readback amplitude (which can be deduced from the specific interpolation formula) multiplied by the derivative of the readback amplitude with respect to head position (which can be measured as described above).

The filter factors that are used to compute the reference waveforms stored for each written track depend on the closed loop response of the servo. Typically, this remains very nearly constant throughout a propagation so they need only be determined at the beginning of the propagation, or can even be predetermined based on measurements on a representative disk file. Large changes in the actuator behavior, such as when the arm encounters an obstruction such as a load/unload ramp, will change the closed loop response quite significantly. Typically this leads to a rapid growth of track shape errors, which provides an extremely sensitive ramp detection mechanism.

While the invention has been particularly shown and described with reference to preferred embodiment(s) thereof, it will be understood by those skilled in the art that various changes in form and details may be made therein without departing from the spirit and scope of the invention.

What is claimed is:

1. A method for servowriting on a data storage medium of a data storage device in which a center of a write element is separated from a center of a read element generally along a direction in which said servowriting steps, said method comprising:

writing one or more bursts on one track of said storage medium while servoing using a position signal derived from respective readback amplitudes of other bursts written previously on a plurality of tracks;

deriving a reference waveform as a function of a position error waveform, said position error waveform corresponding to one or more position errors of said read element relative to the other bursts; and combining multiple reference waveforms corresponding to tracks used in deriving of said position signal to provide a servo reference waveform, and using said servo reference waveform while writing a subsequent track on said storage medium when said read element overlaps said one track.

2. The method of claim 1, wherein said deriving a reference waveform includes:

calculating at least one complex coefficient of a discrete fourier transform of the position error waveform;

multiplying said at least one complex coefficient by at least one complex filter factor, f, thereby creating at least one filtered coefficient;

calculating an inverse discrete fourier transform from said at least one filtered coefficient; and adding said inverse discrete fourier transform to a nominal average reference level to form said reference waveform.

3. The method of claim 2, further including computing f from a predetermined function of a closed loop response, C, of a servo loop used for said servowriting.

4. The method of claim 3, wherein said computing f includes using the relation f=(S−C)/(1−C) where S is a step factor.

5. The method of claim 1, wherein said position signal is derived using a parabolic interpolation of the readback amplitudes of the other bursts written previously on the plurality of tracks.

6. The method of claim 5, wherein the plurality of tracks includes a center track over which the read element is crossing and having the highest readback amplitude, a track preceding the center track, and a track subsequent to the center track.

7. The method of claim 1, wherein the multiple reference waveforms corresponding to tracks used in the deriving of said position signal are combined in a weighted sum to provide the servo reference waveform used in writing the subsequent track.

8. The method of claim 7, wherein respective weights of the weighted sum are equal to the relative sensitivity of the position signal to shifts in the position of each of the tracks respectively.

9. The method of claim 8, wherein the relative sensitivity is given by the partial derivative of the position signal with respect to readback amplitude times the derivative of the readback amplitude with respect to position for each track respectively.

10. The method of claim 1, wherein the center of the write element is separated from the center of the read element by an amount greater than a written track width.

11. A method for servowriting on a data storage medium of a data storage device in which a center of a write element is separated from a center of a read element generally along a direction in which said servowriting steps, said method comprising:
    writing one or more bursts on one track of said storage medium while servoing using a position signal derived from respective readback amplitudes of other bursts written previously on a plurality of tracks;
    wherein said position signal is derived using a parabolic interpolation of the readback amplitudes of the other bursts written previously on the plurality of tracks.

12. The method of claim 11, wherein the plurality of tracks includes a center track over which the read element is crossing and having the highest readback amplitude ("VB"), a track preceding the center track having a respective readback amplitude ("VA"), and a track subsequent to the center track having a respective readback amplitude ("VC").

13. The method of claim 12, wherein the parabolic interpolation is substantially of the form:

$$P = \frac{1}{2} \cdot \frac{V_C - V_A}{2V_B - V_A - V_C}.$$

14. A system for servowriting on a data storage medium of a data storage device in which a center of a write element is separated from a center of a read element generally along a direction in which said servowriting steps, said system comprising:
    means for writing one or more bursts on one track of said storage medium while servoing using a position signal derived from respective readback amplitudes of other bursts written previously on a plurality of tracks;
    means for deriving a reference waveform as a function of a position error waveform, said position error waveform corresponding to one or more position errors of said read element relative to the other bursts; and
    means for combining multiple reference waveforms corresponding to tracks used in deriving of said position signal to provide a servo reference waveform, and means for using said servo reference waveform while writing a subsequent track on said storage medium when said read element overlaps said one track.

15. The system of claim 14, wherein said means for deriving includes:
    means for calculating at least one complex coefficient of a discrete fourier transform of the position error waveform;
    means for multiplying said at least one complex coefficient by at least one complex filter factor, f, thereby creating at least one filtered coefficient;
    means for calculating an inverse discrete fourier transform from said at least one filtered coefficient; and
    means for adding said inverse discrete fourier transform to a nominal average reference level to form said reference waveform.

16. The system of claim 15, further including means for computing f from a predetermined function of a closed loop response, C, of a servo loop used for said servowriting.

17. The system of claim 16, wherein said means for computing f includes means for using the relation f=(S−C)/(1−C) where S is a step factor.

18. The system of claim 14, wherein said position signal is derived using a parabolic interpolation of the readback amplitudes of the other bursts written previously on the plurality of tracks.

19. The system of claim 18, wherein the plurality of tracks includes a center track over which the read element is crossing and having the highest readback amplitude, a track preceding the center track, and a track subsequent to the center track.

20. The system of claim 14, wherein the multiple reference waveforms corresponding to tracks used in the means for deriving of said position signal are combined in a weighted sum to provide the servo reference waveform used in writing the subsequent track.

21. The system of claim 20, wherein respective weights of the weighted sum are equal to the relative sensitivity of the position signal to shifts in the position of each of the tracks respectively.

22. The system of claim 21, wherein the relative sensitivity is given by the partial derivative of the position signal with respect to readback amplitude times the derivative of the readback amplitude with respect to position for each track respectively.

23. The system of claim 14, wherein the center of the write element is separated from the center of the read element by an amount greater than a written track width.

24. A system for servowriting on a data storage medium of a data storage device in which a center of a write element is separated from a center of a read element generally along a direction in which said servowriting steps, said system comprising:
    means for writing one or more bursts on one track of said storage medium while servoing using a position signal derived from respective readback amplitudes of other bursts written previously on a plurality of tracks; and
    means for deriving said position signal using a parabolic interpolation of the readback amplitudes of the other bursts written previously on the plurality of tracks.

25. The system of claim 24, wherein the plurality of tracks includes a center track over which the read element is crossing and having the highest readback amplitude ("VB"), a track preceding the center track having a respective readback amplitude ("VA"), and a track subsequent to the center track having a respective readback amplitude ("VC").

26. The system of claim 25, wherein the parabolic interpolation is substantially of the form:

$$P = \frac{1}{2} \cdot \frac{V_C - V_A}{2V_B - V_A - V_C}.$$

* * * * *